United States Patent
Espenan et al.

(10) Patent No.: US 9,604,855 B2
(45) Date of Patent: Mar. 28, 2017

(54) WATER FILTRATION MODULE AND METHOD FOR THE MANUFACTURE AND USE THEREOF

(75) Inventors: Jean-Michel Espenan, Deyme (FR); Franc Saux, Sainte Foy d'aigrefeuille (FR)

(73) Assignee: POLYEM, Toulouse (FR)

( * ) Notice: Subject to any disclaimer, the term of this patent is extended or adjusted under 35 U.S.C. 154(b) by 777 days.

(21) Appl. No.: 13/704,348

(22) PCT Filed: Jun. 17, 2011

(86) PCT No.: PCT/EP2011/060157
§ 371 (c)(1),
(2), (4) Date: Jan. 3, 2013

(87) PCT Pub. No.: WO2011/157835
PCT Pub. Date: Dec. 22, 2011

(65) Prior Publication Data
US 2013/0098821 A1  Apr. 25, 2013

(30) Foreign Application Priority Data
Jun. 18, 2010  (FR) .................................... 10 54853

(51) Int. Cl.
*C02F 1/00*   (2006.01)
*B01D 61/18*  (2006.01)
(Continued)

(52) U.S. Cl.
CPC ................ *C02F 1/00* (2013.01); *B01D 61/18* (2013.01); *B01D 63/021* (2013.01);
(Continued)

(58) Field of Classification Search
CPC ........ B01D 61/18; B01D 61/14; B01D 61/00; B01D 63/02; B01D 2313/26;
(Continued)

(56) References Cited

U.S. PATENT DOCUMENTS 4,666,469 A * 5/1987 Krueger ................. B01D 63/02
 95/54
4,876,006 A  10/1989 Ohkubo et al.
(Continued)

FOREIGN PATENT DOCUMENTS

DE  298 04 927  6/1998
EP  1 310 291   5/2003
(Continued)

OTHER PUBLICATIONS

International Search Report dated Aug. 1, 2011, corresponding to PCT/EP2011/060157.

*Primary Examiner* — Krishnan S Menon
*Assistant Examiner* — Liam Royce
(74) *Attorney, Agent, or Firm* — Young & Thompson

(57) ABSTRACT

A water filtration module (10) is made of hollow fibers for filtration from the outside to the inside of the fibers, wherein the fibers are arranged inside a casing (11) made of multiple elements (20). The module (10) and at least one element (20) include elements working together, which are designed to enable the element (20) to be mounted in the module (10) in a removable manner.

17 Claims, 3 Drawing Sheets

(51) Int. Cl.
*B01D 65/10* (2006.01)
*B01D 63/02* (2006.01)
*C02F 1/44* (2006.01)
*B01D 63/04* (2006.01)

(52) U.S. Cl.
CPC .......... *B01D 63/043* (2013.01); *B01D 65/102* (2013.01); *C02F 1/444* (2013.01); *B01D 2313/06* (2013.01); *B01D 2313/16* (2013.01); *B01D 2313/21* (2013.01); *B01D 2313/26* (2013.01); *Y10T 29/49718* (2015.01); *Y10T 29/49826* (2015.01)

(58) Field of Classification Search
CPC ............ B01D 2313/00; B01D 2313/16; B01D 2313/06; B01D 2313/21; B01D 63/022; B01D 63/021; B01D 63/00; B01D 63/043; Y10T 29/49826; Y10T 29/49; Y10T 29/49718; C02F 1/00; C02F 1/444; C02F 1/44
See application file for complete search history.

(56) References Cited

U.S. PATENT DOCUMENTS

| | | | | |
|---|---|---|---|---|
| 5,228,991 A | * | 7/1993 | Strohm | B01D 63/02 210/321.8 |
| 2001/0047962 A1 | * | 12/2001 | Zha | B01D 63/02 210/636 |
| 2002/0003105 A1 | * | 1/2002 | McEvoy | B01D 61/38 210/497.1 |
| 2006/0113235 A1 | * | 6/2006 | Strohm et al. | 210/232 |
| 2011/0059462 A1 | * | 3/2011 | Lim | G01N 1/4077 435/6.13 |

FOREIGN PATENT DOCUMENTS

| | | |
|---|---|---|
| JP | 7 185268 | 7/1995 |
| JP | 2006 239548 | 9/2006 |
| WO | 96/41676 | 12/1996 |
| WO | 2006/037234 | 4/2006 |

* cited by examiner

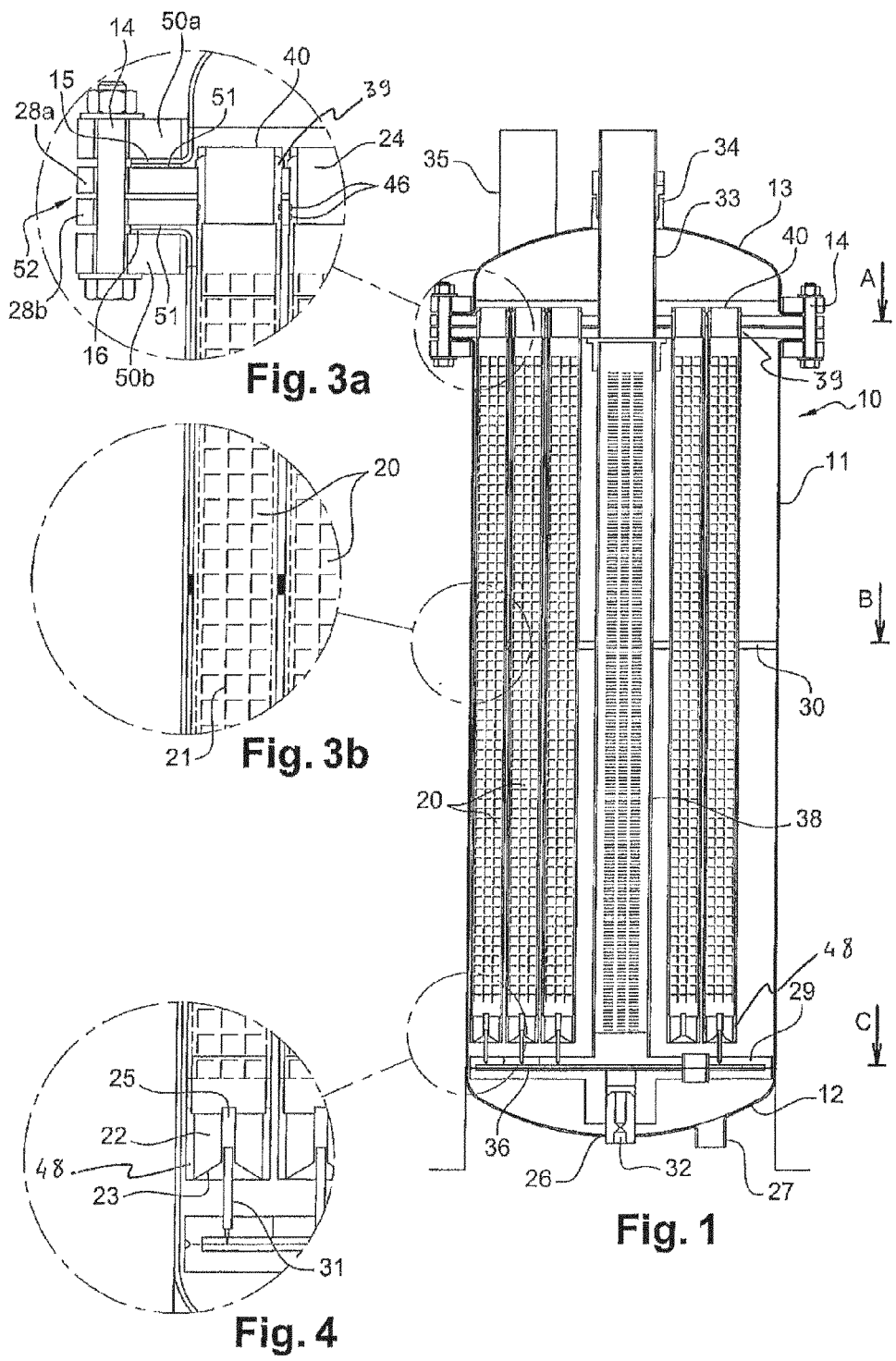

WATER FILTRATION MODULE AND METHOD FOR THE MANUFACTURE AND USE THEREOF

The present invention belongs to the field of water treatment devices. It relates more specifically to devices filtering large quantities of water via membranes, in particular ultrafiltration, installed, for example, at local authorities.

BACKGROUND OF THE INVENTION AND PROBLEM STATEMENT

Water filtration devices for local communities, implemented with the aim of supplying water suitable for human consumption, traditionally use series of ultrafiltration modules arranged side by side. An ultrafiltration technique is considered here that uses hollow fibers supplied with water under a pressure of a few bars, such that the filtration sought is performed by the waters passage from the exterior of the fiber towards the interior through the porous wall forming its membrane. These modules, of cylindrical shape overall, comprise substantially cylindrical bundles of several hundreds of such hollow fibers.

In a particular mode of implementation, these modules are supplied with untreated water via their upper extremity. The water purified after passing through the wall of the membranes is also collected at the upper extremity. The treatment sludge is evacuated by a lower drain. It is understood that, depending on the maximum quantity of water that must be treated per unit of time, larger or smaller series of modules are installed between the horizontal pipes for water inlet and outlet and for sludge drainage.

When one of the hollow fibers breaks, it lets untreated water pass through in the flow of water supposed to be drinkable on output. For obvious public health reasons such a situation cannot be maintained for long. Also, various mechanisms for detecting and closing damaged fibers have been put in place over time.

Furthermore, the existing installations using these modules require a significant ground area, since each module has a limited maximum treatment capacity, and these installations therefore usually comprise numerous paralleled modules, linked at the water inlets and outlets by a complex set of pipes controlled by a set of valves and one or more control PLCs. The engineering and deployment of these installations are therefore very costly.

OBJECTIVES OF THE INVENTION

The objective of this invention is thus to propose a new type of hollow fiber filtration module making it possible to reduce the ground area required by the installations, and reducing their engineering and deployment costs.

According to a second objective of the invention, this permits simpler and less costly maintenance than the existing devices.

DESCRIPTION OF THE INVENTION

To this end, the invention envisages, firstly, a water filtration module made of hollow fibers for filtration from the outside to the inside of the fibers, wherein the fibers are arranged inside a casing in multiple elements, characterized in that the module and at least one element comprise means working together, which are designed to enable the element to be mounted in the module in a removable manner.

According to an advantageous implementation, the module is of the type positioned vertically in use and comprises elements of a substantially cylindrical shape, the mounting means comprise two positioning plates on the casing side and, on the element side, an upper sleeve attached in the upper positioning plate and sliding freely in a through hole of the lower positioning plate, to which it is connected by at least one o-ring.

It is understood that the method of attaching the upper sleeve onto the upper positioning plate can notably consist of screwing.

More specifically, the elements are held in place in the casing by:
  the two positioning plates at the top of the module, onto which the elements are suspended,
  a baseplate comprising a set of air injectors, these air injectors being positioned so as to fit into longitudinal cylindrical recesses of the elements.

According to an even more particular embodiment, the baseplate is connected to an air nozzle and comprises a circuit distributing air from this air nozzle to the air injectors of the various elements.

According to an advantageous embodiment, a strainer, coaxial with the longitudinal axis of the filtration module and having a length substantially equally to that of the casing, is positioned between the bottom of the pipe supplying the water to be treated and the baseplate, on which it rests and to which it is fixed.

It should be noted that the strainer plays a double role: firstly, it allows the flow for treatment to be distributed and the backwashing air and water to be collected and, secondly, by being a filter of large particles placed as close as possible to the fibers, it prevents the mechanical damage that may be caused by corrosion particles or manufacturing residue (machining) of pipes located between the installation's general screening and the modules.

In a second aspect the invention envisages a water filtration element for a module as described such that at one extremity, called the lower extremity, of each element the extremity of the hollow fibers is buried in a block of rigid coating, this block comprising a conically shaped recess designed to form a guide shaft, a longitudinal cylindrical recess emerging at the center of the guide shaft and completely traversing the block of rigid coating.

In another aspect the invention envisages a water filtration element for the module as described such that at one extremity, called the upper extremity, of this element the extremity of the hollow fibers emerges from a block of rigid coating, this block being laterally girded by an upper sleeve, which comes to the same level as the top of the hollow fibers, and has a mainly cylindrical outside profile comprising from top to bottom:
  a first threaded area,
  a bearing ring,
  a second threaded area,
  a smooth area comprising grooves designed for the insertion of o-rings.

According to an advantageous embodiment, the element as described comprises a substantially cylindrical bundle of hollow fibers held in shape by a flexible grid, the upper sleeve comprising a lower area, substantially of a truncated cone profile, tapering towards the bottom, designed to accommodate the upper edge of the grid, this lower area comprising surface textures substantially complementing the shape of the grid, and designed to allow the engagement and locking of the grid (on the upper sleeve), the element also comprising a lower sleeve fitting tightly round the hollow fibers in the lower portion of the element, at the lower extremity of the fibers, the lower sleeve being substantially cylindrical and comprising in its upper portion a truncated cone area with a profile substantially identical to that of the lower area of the upper sleeve, and also designed to allow the engagement and locking of the grid on this lower sleeve.

In yet another aspect, the invention envisages a method of manufacturing an element as described above, the method comprising the following steps:
  assembling fibers into a substantially cylindrical bundle with a predefined diameter,
  placing sleeves at the extremities of said bundle,
  packing extremities into bicomponent resin blocks,
  passing a flexible grid around the bundle and locking onto the upper and lower sleeves.

The invention also envisages a water treatment installation comprising a module as described, as well as an inlet pipe for water to be treated, a purified water collection pipe, a filtration sludge drain, a compressed air distribution circuit and a PLC controlling valves for the various pipes, drains and circuits, said PLC being attached to the module.

In yet another aspect, the invention envisages a method of assembling a module as described, the method comprising the following steps:
  during assembly the casing, with the base plate already fitted, is fastened to the drain's evacuation line and to the air nozzle,
  the central strainer is installed and screwed onto the base plate,
  the two positioning plates are positioned resting on the flange of the casing, a space one to several millimeters thick being provided between these positioning plates,
  the injectors, the holes of the guide device and the holes of the positioning plates are aligned to allow elements to be installed,
  the elements are then inserted in the module, the o-rings being positioned in the grooves of the smooth area,
  each element is fixed in place by screwing the threaded portion of the sleeve onto the threaded portion of a through hole of the upper positioning plate, an o-ring being inserted between the lower surface of the bearing ring and the upper surface of the upper positioning plate,
  once the elements have been installed, the cover is installed and the bolts clamp the cover and the positioning plates on the casing,
  the inlet lines for the water to be treated and the lines for collecting the purified water are then connected to the cover.

Lastly, the invention envisages a maintenance method for a module as described, wherein the method comprises the following steps performed in a first period of time:
  injection of air into the module through the portion for collecting purified water in order to detect any broken fibers, the cover being left in place and the air thus filling the interior of the fibers,
  observation of air rising through the strainer, indicating the presence of at least one broken fiber in the module and, in that case,
    injection of air into the module through the portion for injecting water to be treated, the air thus filling the outside of the fibers, the cover being removed, and a little water left above the upper portion of the hollow fibers,
    observation of any bubbling phenomenon above the fibers, indicating which fibers are broken,
    plugging fibers detected as broken, or closing the top of the element comprising these broken fibers if the number of broken fibers is above a predefined threshold, and the following steps performed in a second period of time, longer than the first:
  removal of elements comprising a number of broken fibers above a predefined threshold, and replacement of said elements.

The invention also envisages a water filtration element for a water filtration module made of hollow fibers for filtration from the outside to the inside of the fibers, wherein the fibers are arranged inside a casing made of multiple elements, the module and at least one element comprising means working together, which are designed to enable the element to be mounted in the module in a removable manner,
  in which at one extremity, called the upper extremity, of this element the extremity of the hollow fibers emerges from a block of rigid coating, this block being laterally girded by an upper sleeve, which comes to the same level as the top of the hollow fibers, and has a mainly cylindrical outside profile comprising from top to bottom:
    a first threaded area, designed to receive a plug closing the element,
    a bearing ring, designed to rest on a positioning plate,
    a second threaded area, designed to be screwed into a complementary threaded area of a positioning plate,
    a smooth area comprising grooves designed for the insertion of o-rings.

This provision allows the element to be made really modular, by offering the possibility of closing it in the upper portion when a portion of the fibers is broken, and of easily fixing it in place in the module while maintaining excellent hermeticity.

The invention also envisages a water filtration module made of hollow fibers for filtration from the outside to the inside of the fibers, of the type positioned vertically in use, the module comprising elements as described, the mounting means comprising two positioning plates on the casing side, the upper sleeve of each element being attached in the upper positioning plate and sliding freely in a through hole of the lower positioning plate, to which it is connected by at least one o-ring.

BRIEF DESCRIPTION OF THE FIGURES

The description that will follow, given solely as an example of an embodiment of the invention, is made with reference to the figures included in an appendix, which show:

FIG. 1: a side cross-section view of a filtration module consistent with an embodiment of the invention, FIG. 4: a detail cross-section view of the lower portion of the module.

DETAILED DESCRIPTION OF AN EMBODIMENT OF THE INVENTION

Figure 2A:
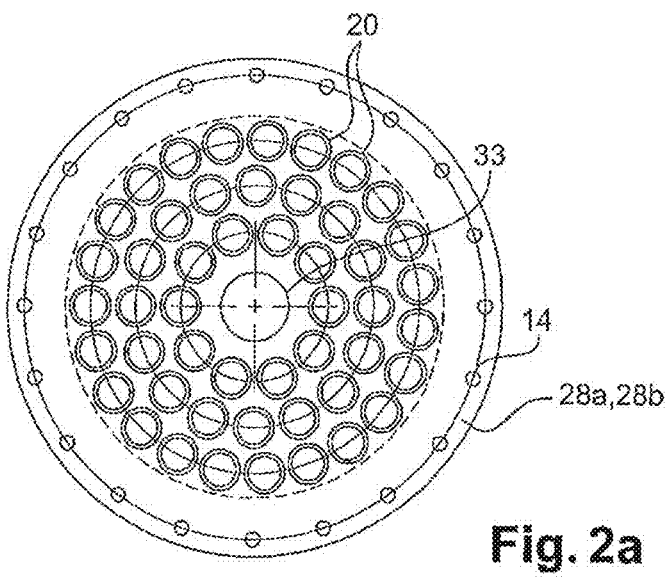
FIGS. 2a, 2b and 2c: three cross-section views, along planes A, B, C perpendicular to the plane of FIG. 1, FIGS. 3a and 3b: detail cross-section views of two plates fixing elements in the upper portion of the module, and the intermediate guide plate.

The invention relates to an ultrafiltration module 10 made of bundles of hollow fibers.

A vertical axis Z, parallel to the main axis of the filtration module 10, and two horizontal axes X and Y, perpendicular to this vertical axis Z, are defined for the rest of the description.

In the embodiment described here as a non-limiting example, the hollow filtration fibers each have a diameter of several tenths of a millimeter and a length of approximately 1.5 meters. Their dimensional and material characteristics are known to the person skilled in the art and are outside the framework of this invention. They are not therefore described any further here.

The hollow fibers are assembled by groups of several thousand (typically 4000) into longitudinal bundles, substantially cylindrical in this example, from five to six centimeters in diameter, each element 20 thus formed being held in shape by a grid 21 made of plastic, here a square mesh with approximately one centimeter sides (see FIG. 1). The grid 21 makes it possible to maintain the general shape of the bundle of hollow fibers, while leaving them to move naturally in the flow of water when they are in use.

At one extremity, called the lower extremity, of each element 20, the extremity of the hollow fibers is buried in a block 22 of bicomponent resin, known per se, about five centimeters thick, which plugs their lower extremity.

This resin block 22 comprises a conically-shaped recess intended to form a guide shaft 23 for an air injector independent of the element 20. A longitudinal cylindrical recess 25, with a diameter of approximately 6 millimeters in this example, emerging at the center of the guide shaft 23, completely traverses the resin block 22, so as to allow air to be injected between the hollow fibers during phases of cleaning or of detecting damaged fibers.

At their upper portion 40, the hollow fibers emerge out of a resin coating 24, also of bicomponent type known per se, and also approximately five centimeters thick. It is understood that, in this way, the water that has just traversed their wall is guided towards the upper portion of said hollow fibers.

Several tens of elements 20 are then incorporated into a filtration module 10. In this case, forty-nine elements 20 are positioned in three concentric circles (see FIGS. 2a to 2c) within the filtration module 10, with ten, sixteen and twenty-three elements positioned in these three concentric circles, leaving free a central space for injecting water to be treated. It is clear that these elements 20 are positioned so as to leave the least possible unused space between them, to minimize the volume of the module 10.

As shown in FIG. 1, a filtration module 10 consistent with a particular embodiment of the invention comprises a casing 11, mainly cylindrical in shape, terminated in its lower extremity by a base 12, and in its upper portion by a cover 13. The base 12 and the cover 13 each substantially present a flattened half-ellipsoid shape.

In this example, described here in a non-limiting example, the module 10 has a height of approximately two meters and a diameter of sixty centimeters. However, it is clear that this diameter can be raised arbitrarily to substantially higher values, depending on the number of elements incorporated in said filtration module 10, which is directly linked to the volume of water to be treated per hour of operation. In the case, for example, of a module comprising approximately two hundred elements 20, the diameter can reach 1.2 meters.

The base 12 is secured to the casing 11 by joint molding during manufacture, welding, bonding or other technique suitable for the material forming the casing 11. This can notably be made of a composite material in the case of seawater treatment, or in stainless steel or coated, or made of plastic material in the case of a freshwater treatment module.

This base 12 comprises a central aperture 26, intended for the passage of an air nozzle 32, and a lateral drain 27 intended for the evacuation of washing sludge.

Figure 2B:
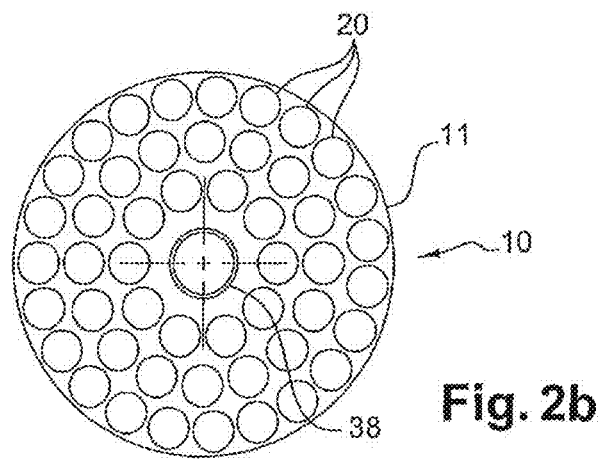
Figure 2C:
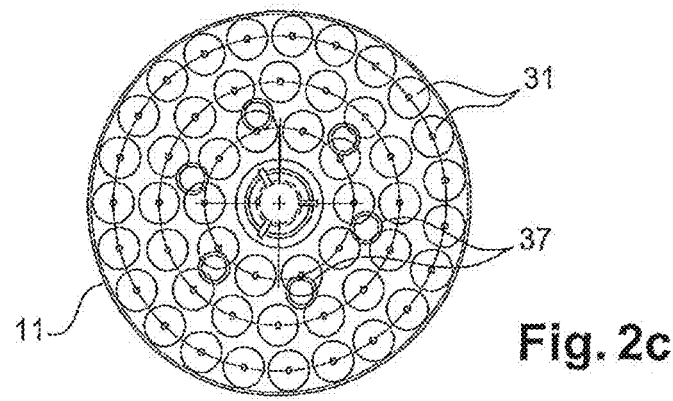

These elements 20 are held in place in the casing 11 by three devices:
- two positioning plates 28a, 28b at the top of the module, onto which the elements 20 are suspended (see FIG. 2a and FIG. 3a),
- a baseplate 29 comprising a set of air injectors 31, these air injectors 31 being positioned so as to fit into longitudinal cylindrical recesses 25 of the elements 20, possibly being guided into them by the guide shafts 23 (see FIG. 2c and FIG. 4),
- an intermediate guide plate 30 (see FIG. 3b) comprising a set of perforations with a diameter and position designed to allow the passage of the elements 20 (see FIG. 2b).

The baseplate 29 is linked to the air nozzle 32, and comprises a circuit 36 distributing air from this air nozzle 32 to the various air injectors 31 of the various elements 20 incorporated in the filtration module 10. The baseplate 29 also comprises a set of six through holes 37 intended to allow water to pass freely between the upper and lower portions of said baseplate 29.

The materials forming the positioning plates 28, baseplate 29 and intermediate guide plate 30 are determined by the nature of the water to be treated, freshwater or seawater, in a way known to the person skilled in the art.

The cover 13 is removable. In this example, it is fixed onto the casing 11 by means of a fixing device detailed in FIG. 3. This comprises a set of bolts 14 clamping firstly a first flange 15 secured to a cover 13, secondly, the two positioning plates 28a, 28b of the elements 20 and, lastly, a second flange 16 secured to the casing 11.

The thicknesses of the material of the casing 11 and the dimensions of the bolts 14 are calculated by the person skilled in the art in a known way, according to the mechanical stresses which the filtration module 10 must withstand.

The cover 13 comprises a central aperture allowing the passage of a pipe 33 supplying water to be treated. A seal 34 ensures hermeticity between the cover 13 and the supply pipe 33.

The cover 13 also comprises an outlet pipe 35 for purified water. For obvious reasons, this outlet pipe 35 has a diameter substantially equal to the pipe 33 supplying water to be treated. In this example, this diameter is approximately ten centimeters (for a flow rate of several tens of m3/hour).

A strainer 38, coaxial with the longitudinal axis of the filtration module 10 and having a length substantially equally to that of the casing 11, is positioned between the bottom of the pipe 33 supplying the water to be treated and the baseplate 29, on which it rests and to which it is fixed by three screws. This strainer 38 is closed at its lower extremity. The strainer 38 is of a type known per se. It is made of a plastic material or stainless steel, depending on the type of water to be treated (thickness several tens to several hundreds of microns).

It is understood that the strainer 38 is intended to distribute the water to be purified from top to bottom of the filtration module 10, towards the elements 20.

In the filtration module 10 according to the invention, the elements 20 can be removed from the module, for example to perform maintenance on the filtration module 10 by replacing some worn elements 20.

This runs counter to the existing hollow fiber filtration modules, in which the elements 20 were fixed to each other and to the casing 11 by casting a bicomponent resin over a thickness of approximately five centimeters at the top of the casing 11. This embodiment, consistent with the previous state of the art, was designed to prevent the passage of microscopic impurities, from the inlet of water to be treated to the purified water outlet.

To allow the elements 20 to be easily dismantled with no negative effect on the hermeticity provided between the lower portion of the filtration module 10, in which the water to be treated circulates, and the upper portion of this module, in which the purified water circulates, the device according to the invention uses an assembly comprising firstly, on the casing 11 side, the two positioning plates 28a, 28b and secondly, on the element 20 side, an upper sleeve 39.

This upper sleeve 39 fits tightly round the hollow fibers in the upper portion of the element 20 (see FIGS. 1 and 3), in particular at the fibers' resin coating area 24. The upper sleeve 39 comes to the same level as the top 40 of the hollow fibers (see FIG. 5), and extends for a dozen centimeters along the element 20.

Figure 5:
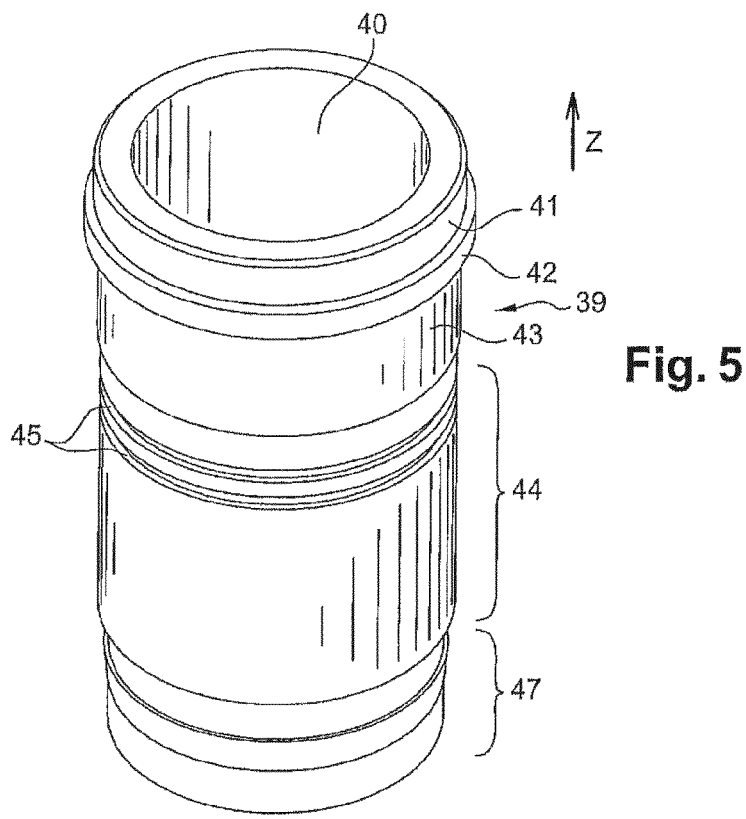
FIG. 5: a detail perspective view of the upper portion of an element.

As can be seen in FIG. 5, the outside profile of this upper sleeve 39, while mainly cylindrical, comprises from top to bottom:
- a first threaded area 41, extending over 0.5 to 1 centimeter,
- a bearing ring 42,
- a second threaded area 43, extending in this example over a height of approximately two centimeters,
- a smooth area 44 comprising grooves 45 designed for the insertion of two o-rings 46 (not shown in FIG. 5),
- a lower area 47, substantially of a truncated cone profile, tapering towards the bottom, intended to accommodate the upper edge of the grid 21 that fits tightly around the hollow fibers of the element 20. Preferably, this lower area 47 comprises surface textures (not shown), in a hollowed-out square mesh pattern, substantially complementing the shape of the grid 21, and designed to allow the engagement and locking of the grid 21 on the upper sleeve 39.

In a complementary way, the upper positioning plate 28a comprises threaded through holes, corresponding to the dimensions of the second threaded area 43 of the upper sleeves 39 of the elements 20 (see FIG. 3).

Similarly, the lower positioning plate 28b comprises smooth cylindrical through holes with a diameter slightly greater than that of the smooth area 44 of the upper sleeves 39, so as to allow o-rings 46 to be inserted between said lower positioning plate 28b and each upper sleeve 39.

Figure 6:
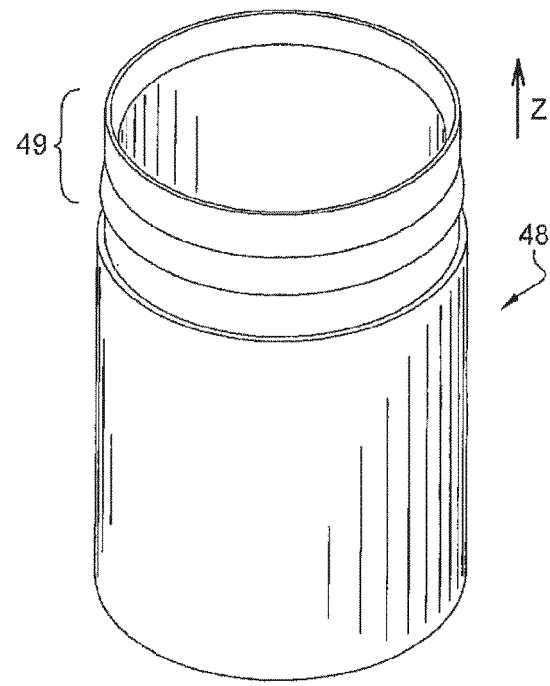
FIG. 6: a detail perspective view of the lower portion of an element.

Each element also comprises a lower sleeve 48 (see FIGS. 4 and 6). This lower sleeve 48 fits tightly round the hollow fibers in the lower portion of the element 20 (see FIGS. 1 and 4), in particular at the resin block 22 coating the lower extremity of the fibers. The lower sleeve 48 comes to the same level as the bottom of the resin block 22, and extends for a dozen centimeters along the element 20; it is substantially cylindrical and comprises in its upper portion a tapered area 49 with a profile substantially identical to that of the lower area 47 of the upper sleeve 39, and also designed to allow the engagement and locking of the grid 21 on this lower sleeve 48.

Installation of the Module

During assembly the casing 11, with the base plate 29 already fitted, is fastened to the evacuation line of the drain 27 and to the air nozzle 32. Then the central strainer 38 is installed and screwed onto the base plate 29. The two positioning plates 28a, 28b are then positioned resting on the flange 16 of the casing 11, a space 52 one to several millimeters thick being provided between these positioning plates 28a, 28b. This space 52 can, for example, be created when welding the positioning plates 28a, 28b to the inlet pipe for the water to be treated 33. This space 52 is intended for venting air-bubbles possibly circulating between the elements 20, and crossing the o-rings 46.

It is understood that the injectors 31, the holes of the guide device 30 and the holes of the positioning plates 28a, 28b are aligned to allow elements 20 to be installed.

These are then inserted in the module 10, the o-rings 46 being positioned in the grooves 45 of the smooth area 44. It is understood that these o-rings 26 are placed facing a smooth area of the lower positioning plate 28b, so as to be able to slide within the smooth cylindrical hole of said lower positioning plate 28b if there is play between the positioning plates. This contributes to preventing the water to be treated being able to easily cross the o-rings 26.

Each element 20 is fixed in place by screwing the threaded portion 43 of the sleeve onto the threaded portion of a through hole of the upper positioning plate 28a, an o-ring being inserted between the lower surface of the bearing ring 42 and the upper surface of the upper positioning plate 28a.

Once the elements 20 have been installed, the cover 13 is installed and the bolts 14 clamp the cover 13 and the positioning plates 28a, 28b on the casing 11. In a non-limiting implementation example, clamping rings 50a, 50b are used to facilitate the mounting of the bolts 14.

Gaskets 51 are possibly inserted between the flanges 15, 16 and the positioning plates 28a, 28b respectively.

The inlet lines for the water to be treated and the lines for collecting the purified water are then connected to the cover 13.

Operating Mode

In regular operation (filtration), the water to be treated is injected by the water inlet pipe 33 into the strainer 38. It is then distributed around the elements 20 under pressure, and passes through the membrane of the hollow fibers of the elements. The water thus purified rises inside the hollow fibers and exits at their upper portion, above the upper positioning plate 28a. It is then collected by the water outlet pipe 35. The o-rings 26 ensure the water tightness of the lower portion of the module 10.

The module 10 is regularly subjected to a backwash, the water being injected via the interior of the hollow fibers, so as to detach the filtration sludge that naturally sticks there in regular operation. The backwash sludge is then evacuated by the drain 27.

Another method of washing the fibers consists of injecting pressurized air via the injectors 31, between the hollow fibers of each element, and possibly between these elements. The very turbulent air and water flow thus created shakes the bundle of fibers and causes its expansion, as well as cleaning the outside walls of the hollow fibers. The air is then evacuated at the upper portion via the strainer 38. The guide device 31, placed half way up the module 10, forms a chicane that forces a preferred passage of the air between the hollow fibers.

The method of washing the strainer comprises a backwash in which, first of all, the sludge is directed towards the bottom of the module. In this way at the beginning of the backwash, when there is a significant amount of particles, the flow does not pass back through the strainer (which could block it).

Subsequently, at the end of backwashing the fibers the backwash water becomes more and more clean and the strainer is washed in the reverse direction, i.e. towards the top, possibly adding an injection of air, which contributes to increasing the effectiveness of the wash.

The injection of air into the module is also used, at regular intervals, to detect any broken fibers. In effect, it is known that the pores of the fibers are naturally impermeable to air below a certain pressure when they are wet.

To this end, air is injected into the module 10 through the portion for collecting purified water in order to detect any broken fibers, the cover 13 being left in place and the air thus filling the interior of the fibers.

If a fiber is broken, it will allow air to pass and air will be observed rising through the strainer 38, indicating the presence of at least one broken fiber in the module. This test is very accurate, since it makes it possible to detect a single broken fiber or to confirm the integrity of the module quickly.

If air is observed rising through the strainer 38, the cover 13 is removed, a little water is left above the upper portion of the hollow fibers, then air is injected into the module 10 via the portion for injecting water to be treated, the air thus filling the exterior of the fibers and the casing being substantially emptied of its water.

Each broken fiber will cause a phenomenon of bubbling above the upper extremity of the fiber, which makes it possible to accurately identify which fibers are broken.

In this way, once the damaged fibers have been detected it is possible, in a way known per se, to plug these fibers or close the top of the defective element by means of an element cover screwed onto the first threaded area 41 of the upper sleeve 39 of the element 20. This element cover allows maintenance operations to be grouped together at long intervals, for example once a year.

If an element's proportion of damaged fibers exceeds a predefined threshold, the element 20 in question is extracted from the module 10 for replacement. To do this, a counterpart (not shown in the figures) is used, which is positioned on the first threaded area 41 of the sleeve 39.

Benefits of the Invention

It is understood that the device according to the invention makes it possible to replace an assembly of a large number of filtration modules with a small diameter (typically twenty to thirty centimeters) by a reduced number of modules with a large diameter (sixty centimeters to one meter twenty). As an example of sizing, the replacement of twenty-centimeter modules by modules with a diameter of sixty centimeters substantially divides the number of necessary modules by nine!

This replacement by large-diameter modules is made possible by the fact that the elements 20 are removable here, and therefore interchangeable, which allows them to be replaced one at a time if they fail. In contrast, consistent with the previous state of the art, a complete module would need to be replaced when one element failed, which naturally would lead to the installation in parallel of numerous modules comprising few elements.

It appears that the reduction in the number of modules translates into space savings in water treatment installations, and consequently, in new installations, in reductions in civil engineering costs and an increased surface area for installations, which may prove very significant in financial terms.

A second consequence is the reduction in the piping required to connect the various modules with the surge tanks for water to be treated, purified water, the drains etc. It is estimated that the cost-savings for a complete installation could reach 20% with the installation of modules as described.

In addition, it is known that, in the installation method consistent with the previous state of the art, a PLC (Programmable Logic Controller) managing valves controlling surge tanks supplying water to be treated and collecting purified water was installed at the end of the line for a series of modules. Replacing a large number of small-diameter modules by a filtration module 10 with a large diameter makes it possible to envisage such a PLC being integrated at the filtration module 10 itself, on the cover, on the side of the filtration module 10, or built into the casing 11. The reduction in the engineering required when an installation is designed may also be significant.

Similarly, replacing elements 20 one at a time when defective, instead of replacing complete modules, necessarily translates into savings in replacement parts and therefore in operating costs for the local authority users.

Another advantage of the device as described is that, thanks to the ability to progressively change the elements 20 while retaining the module 10 within a water treatment installation, it makes it possible to follow the progress made in the technologies of fibers or elements 20. As long as the new elements remain compatible with the dimensions of the passages provided in the positioning plates 28a, 28b, guide device 30 or air injectors 31 of the module 10, they can replace the existing elements without requiring the complete module 10 to be dismantled. This represents a major evolution compared to the previous state of the art, in which the modules must be replaced completely at each technological evolution.

It has been mentioned in the description that the elements are replaced because there are too many broken fibers. In fact, it can be desirable to replace elements because there are better fibers or because the fibers are irreversibly dirty or damaged by unexpected pollution (e.g. by a flow of hydrocarbons). Finally the replacement can be preventive because elements have reached the amortization age and one does not wish to have to carry out maintenance.

It must be recalled that a water treatment system is often built to last for several decades and that the typical lifespan of membranes is 5 to 10 years, whereas the casing, made e.g. of metal, is put in place for a lifespan identical to that of the installations. The filters are therefore replaced periodically. It is therefore very economical (and consistent with a philosophy of sustainable development) to only have to replace the elements (and not the housings) on large installations in particular.

Finally, two known advantages of systems wherein the permeate is only collected at one extremity of the fiber are, firstly, to minimize the piping and, secondly, to simplify the detection and plugging of the damaged fiber: this therefore represents reduced maintenance time (otherwise one side after another must be detected and repaired) and increased reliability for the system.

VARIANTS OF THE INVENTION

The scope of this invention is not limited to the details of the forms of embodiment considered above as an example, but on the contrary extends to modifications in the reach of the expert.

In a variant, elements 200 are used comprising hollow fibers arranged in a "U" in these elements, their two extremities being positioned at the top of said elements, and their fold being placed below.

The invention claimed is:

1. A water filtration element for a water filtration module, comprising:

hollow fibers for filtration from an outside to an inside of the fibers;
a casing in which the hollow fibers are arranged in multiple elements; and
a mount configured to mount at least one water filtration element in a removable manner, the water filtration element having a uniform cylindrical shape with an only protrusion being a bearing ring,
wherein at one extremity, called an upper extremity, of the water filtration element an extremity of the hollow fibers emerges from a block of rigid coating, the block being laterally girded by an upper sleeve, which comes to a same level as a top of the hollow fibers, and has a mainly cylindrical outside profile comprising from top to bottom:
a first threaded area, designed to receive a plug closing the water filtration element,
the bearing ring, designed to rest on a positioning plate,
a second threaded area, designed to be screwed into a complementary threaded area of a positioning plate, and
a smooth area comprising grooves,
o-rings inserted in said grooves,
the first and second threaded areas and grooves being incorporated in a lateral surface of the cylindrical shape.

2. The water filtration element for a module according to claim 1, wherein at one extremity, called a lower extremity, of each element a lower extremity of the hollow fibers is buried in a lower block of rigid coating, said lower block comprising a conically shaped recess designed to form a guide shaft, a longitudinal cylindrical recess emerging at the center of the guide shaft and completely traversing the lower block of rigid coating.

3. The water filtration element according to claim 2, further comprising a substantially cylindrical bundle of hollow fibers held in shape by a flexible grid, the upper sleeve comprising a lower area, substantially of a truncated cone profile, tapering towards the bottom, designed to accommodate an upper edge of the grid, this lower area comprising surface textures, and designed to allow engagement and locking of the grid on the upper sleeve, the element also comprising a lower sleeve fitting tightly round the hollow fibers in the lower portion of the element, at the lower extremity of the fibers, the lower sleeve being substantially cylindrical and comprising in its upper portion a tapered area with a truncated cone profile substantially identical to that of the lower area of the upper sleeve, and also designed to allow the engagement and locking of the grid on this lower sleeve.

4. A water filtration module made of hollow fibers for filtration from the outside to the inside of the fibers, of the type positioned vertically in use,
wherein the water filtration module comprises elements according to claim 1, the mount comprising two positioning plates on a casing side, the upper sleeve of each element being attached in an upper positioning plate and sliding freely in a through hole of a lower positioning plate, to which it is connected by at least one o-ring.

5. The water filtration module according to claim 4, wherein the elements are held in place in the casing by:
the two positioning plates at the top of the module, onto which the elements are suspended,
a baseplate comprising a set of air injectors, these air injectors being positioned so as to fit into longitudinal cylindrical recesses of the elements.

6. The water filtration module according to claim 5, wherein the baseplate is linked to an air nozzle, and comprises a circuit distributing air from this air nozzle to the air injectors of the various elements.

7. The water filtration module according to claim 4, wherein a strainer, coaxial with the longitudinal axis of the filtration module and having a length substantially equally to that of the casing, is positioned between the bottom of a pipe supplying the water to be treated and the baseplate, on which it rests and to which it is fixed.

8. A water treatment installation comprising the water filtration module according to claim 4, as well as an inlet pipe for water to be treated, a purified water collection pipe, a filtration sludge drain, a compressed air distribution circuit and a programmable logic controller controlling valves, said programmable logic controller being attached to the module.

9. A water filtration module made of hollow fibers for filtration from the outside to the inside of the fibers, of the type positioned vertically in use,
wherein the module comprises elements according to claim 2, the mount comprising two positioning plates on a casing side, the upper sleeve of each element being attached in an upper positioning plate and sliding freely in a through hole of a lower positioning plate, to which is connected by at least one o-ring.

10. A water filtration module made of hollow fibers for filtration from the outside to the inside of the fibers, of the type positioned vertically in use,
wherein the module comprises elements according to claim 3, the mount comprising two positioning plates on a casing side, the upper sleeve of each element being attached in an upper positioning plate and sliding freely in a through hole of a lower positioning plate, to which is connected by at least one o-ring.

11. The water filtration module according to claim 5, wherein a strainer, coaxial with the longitudinal axis of the filtration module and having a length substantially equally to that of the casing, is positioned between a bottom of a pipe supplying the water to be treated and the baseplate, on which the pipe rests and is fixed.

12. The water filtration module according to claim 6, wherein a strainer, coaxial with the longitudinal axis of the filtration module and having a length substantially equally to that of the casing, is positioned between a bottom of a pipe supplying the water to be treated and the baseplate, on which the pipe rests and is fixed.

13. A water treatment installation comprising the water filtration module according to claim 5, as well as an inlet pipe for water to be treated, a purified water collection pipe, a filtration sludge drain, a compressed air distribution circuit and a programmable logic controller controlling valves, said programmable logic controller being attached to the module.

14. A water treatment installation comprising the water filtration module according to claim 6, as well as an inlet pipe for water to be treated, a purified water collection pipe, a filtration sludge drain, a compressed air distribution circuit and a programmable logic controller controlling valves, said programmable logic controller being attached to the module.

15. A water treatment installation comprising the water filtration module according to claim 7, as well as an inlet pipe for water to be treated, a purified water collection pipe, a filtration sludge drain, a compressed air distribution circuit and a programmable logic controller controlling valves, said programmable logic controller being attached to the module.

16. A water treatment installation comprising the water filtration module according to claim 9, as well as an inlet pipe for water to be treated, a purified water collection pipe, a filtration sludge drain, a compressed air distribution circuit and a programmable logic controller controlling valves, said programmable logic controller being attached to the module.

17. A water treatment installation comprising the water filtration module according to claim 10, as well as an inlet pipe for water to be treated, a purified water collection pipe, a filtration sludge drain, a compressed air distribution circuit and a programmable logic controller controlling valves, said programmable logic controller being attached to the module.

* * * * *